United States Patent [19]

Rettenbacher et al.

[11] Patent Number: 5,939,192

[45] Date of Patent: *Aug. 17, 1999

[54] MOULDING MADE FROM OR INCLUDING AN ENVIRONMENTALLY ACCEPTABLE MATERIAL, A PROCESS FOR MANUFACTURING THE SAME, AND THE USE OF SAID MOULDING

[76] Inventors: Markus Rettenbacher, Unterthurnstrasse 138, A-5412 Puch; Norbert Mundigler, Hotzendorfgasse 3, A-3423 St. Andra/Wordern, both of Austria

[ * ] Notice: This patent is subject to a terminal disclaimer.

[21] Appl. No.: 08/586,902

[22] PCT Filed: Jul. 29, 1994

[86] PCT No.: PCT/EP94/02535

§ 371 Date: Feb. 12, 1996

§ 102(e) Date: Feb. 12, 1996

[87] PCT Pub. No.: WO95/04111

PCT Pub. Date: Feb. 9, 1995

[30] Foreign Application Priority Data

Jul. 29, 1993 [AT] Austria ..................... 1512/93

[51] Int. Cl.[6] ..................................... D02G 3/00
[52] U.S. Cl. .................. 428/401; 428/372; 428/375; 428/378; 428/357; 428/359; 428/361; 428/364; 428/368; 428/220; 428/339; 428/365
[58] Field of Search .................. 428/35.6, 36.4, 428/36.5, 53, 220, 339, 365; 264/45.1, 640, 641

[56] References Cited

U.S. PATENT DOCUMENTS 1,664,601 4/1928 Ellis .
4,377,440 3/1983 Gasland .

FOREIGN PATENT DOCUMENTS

| 0304401 A3 | 2/1989 | European Pat. Off. . |
|---|---|---|
| 0 474 095 B1 | 3/1992 | European Pat. Off. . |
| A-0524920 | 1/1993 | European Pat. Off. . |
| 837617 | 2/1939 | France . |
| A-440635 | 2/1997 | Germany . |
| A-1230672 | 9/1989 | Japan . |
| A-1024484 | 6/1983 | U.S.S.R. . |
| A-542794 | 1/1942 | United Kingdom . |
| A-869445 | 5/1961 | United Kingdom . |
| 2208651 | 4/1989 | United Kingdom . |
| 2 246 355 | 1/1992 | United Kingdom . |
| WO 90/14935 A1 | 12/1990 | WIPO . |
| WO A-94/14886 | 7/1994 | WIPO . |

OTHER PUBLICATIONS

Database WPI, Week 8943, *Derwent Publications Ltd.,* London, GB; AN 89–312865, English–language abstract of SU A–1024484.

Database WPI, Week 8415, *Derwent Publications Ltd.,* London, GB; AN 84–092852, English–language abstract of JP A–1230672.

*Primary Examiner*—Richard Weisberger
*Attorney, Agent, or Firm*—Oliff & Berridge, PLC

[57] ABSTRACT

A novel, bio-degradable molding based on particles of a plant fiber material, preferably wood and/or cellulose, in particular recycled fiber material, as well as other additives, which are integrated preferably with starch and/or protein into a matrix of at least one biogenic material which has been reduced at high temperature and pressure to a molten state and undergone thermoplastic treatment, and a process for manufacturing the molding and uses thereof. The molding is substantially free of pores and the particles are at least partially impregnated with at least one resin acid (where appropriate mixed with at least one fatty acid, in particular from tall oil and/or natural resins) and preferably also with at least one fat, oil and/or wax; the total water content of the molding is no greater than 18 wt %, preferably 3–16 wt %, and in particular 4–12 wt %, while its preferred density is 0.8–1.25 t/m$^3$.

60 Claims, No Drawings

MOULDING MADE FROM OR INCLUDING AN ENVIRONMENTALLY ACCEPTABLE MATERIAL, A PROCESS FOR MANUFACTURING THE SAME, AND THE USE OF SAID MOULDING

The present invention relates to a novel, bio-degradable molding based on plant fiber materials that are integrated into a matrix of at least one biogenic material that has been reduced at high temperature and pressure to a molten state and which has undergone thermoplastic treatment.

A large number of synthetic materials, filled in part with natural fiber materials, are known for the most varied purposes, particularly for accessory parts, elements of furniture of all kinds and for the most varied branches and areas of industry; these suffer from a severe disadvantage in that they are difficult to dispose of in an environmentally benign manner and are not biologically degradable, at least over the long term and for the most part.

As a result of greatly increased environmental awareness, in particular in the wake of the use of renewable raw materials, which preserves fossil-fuel resources, there have been a large number of publications and patents that have as their objects bio-degradable, recyclable materials based on starch, or plants or parts of plants that contain this as an important component, such as dextrins, cell-wall poly saccharides, proteins, and chitins.

By way of example, reference is made here to articles that are of injection-molded starch, etc., e.g., for packaging, as described in EP 0304401 A3 and GB 2208651 A.

Also known is a material that is based on a plant-fibre material, in particular wood, that is integrated into a starch matrix or an appropriately molten biomaterial, the matrix itself incorporating a large number of pores as a result of the expansion that takes place when the starch-fibre material is extruded. This results in an easily handled, mechanically strong material that can be processed in the normal way, which has an extremely low volumetric density and a high thermal-insulation capacity. In this connection, reference is made—similarly by way of example—to WO 90/14935 81.

However, for the most varied purposes, in particular if great strength, water resistance, a low level of brittleness, and a compact feel are wanted or demanded, very frequently the light-dense products referred to above display weaknesses with respect to these very properties. For this reason, a requirement has been voiced for a dense, biogenic product that can resist normal wear and tear over the long-term and in which a higher density does not constitute an essentially troublesome factor.

It is the task of the present invention to create a new product that is based on plant-fiber materials and one or a plurality of biogenic melt-gel binders which, as a result of their density and stability, and whilst remaining environmentally acceptable and biodegradable, open up areas of application that were previously reserved for wood or fibre-panel materials or synthetic plastics that, for all practical purposes, are machined by cutting.

According to the present invention, the solution to this problem is a molding of the type described in the introduction hereto, that is essentially such that it displays the following characteristic features:

it is essentially free of pores;
it consists of a molding substance with particles of at least one plant fiber material that is based on wood and or cellulose, in particular such materials that have been recycled, as well as of additional additives;
these particles are embedded in a matrix of at least one binding agent that forms a gel-melt, from the group of biopolymers, preferably starches, proteins, lignins, hemi-celluloses, dextrins, pectins and/or chitins, in particular cereals that contain the starches or starch in a predominant quantity, mixed with protein where this is appropriate;
in addition, they are impregnated, at least in part, with at least one resin acid, where appropriate mixed with at least one fatty acid, in particular from tall oil and/or natural resins;
the total water content of the molding is at most 18%-wt, preferably three–16%-wt, in particular 4–12%-wt, and the underlying molding material contains the following components that are combined up as follows:

| %-Wt | Preferred %-wt | Components | Preferred Components |
|---|---|---|---|
| 40–80 | 48–60 | Plant-fibre materials | Wood, cellulose |
| 15–45 | 20–35 | Biopolymers that form gel-melts | Starches, proteins |
| 2–15 | 5–10 | Resin acid(s), where appropriate fatty acid(s) | of tall oil and/or natural resins |
| 1–10 | 1.5–7 | Fats, oils, waxes | Hardening oils |
| 0.5–12 | 2–8 | expansion-suppresant polyols, salts | Glycerine |

Here, resin acid(s) are understood to be resin acids such as occur when processing natural resins, as well as resin acid derivatives and modified resin acids, e.g., those esterified with polyoles, for example on the basis of diterpenes and/or triterpenes, or the like.

In the broadest sense, these also include natural hard resins, soft resins (balsams) and/or gum resins, which containresin acids of this kind as the principal components, for example Dammar resin, copals, elemi, gutti, and the like.

It is surprising that even though it is obtained by means of thermoplastic manufacturing and shaping processes, the new material is characterized by a great similarity to wood. This similarity to wood make it amenable to all the known and trusted processes that are familiar in the domain of wood processing, wood finishing, surface treatment and wood joining techniques, such as, for example, drilling, sawing, grinding, chipping, cutting, gluing, dowelling, screwing, lacquering, coating, and the like. In addition, it permits a synergy of quality that cannot be achieved with conventional plastics, for example, those that are based on polyvinyl or alkylene polymers.

Compared to wood, the new product has the advantage—amongst others—of unrestricted choice of shape and—as a consequence of its homogeneous structure—the advantage that its characteristics are independent of the direction of its fibers, faults, and growth rings. In addition, in particular because it is made up of bio-polymer(s) and particular fiber materials, it is distinguished by much more rapid biological degradability compared to conventional wood.

An important feature of the new product is that it is compact and, for all practical purposes free of pores; any expansion or formation of pores is essentially precluded when it is being manufactured. It has been shown that, in order to achieve the advantageous properties of the new molding as described above, the quantity of the gel-melt binder should be kept relatively small compared to the quantity of plant-fibre material, for example wood, that is used.

Quite unexpectedly, or counter to all expectations, a particularly favorable synergistic bonding of the fibre material into a starch/protein-gel matrix is achieved by the (partial) impregnation of the fibers or the wood particles with resin acid (B), for example of tall oil or natural resins, optionally mixed with fatty acids and/or fats/oils/waxes.

An important component of the tall oil is abietinic acid, which is a resin acid. In addition, the tall oil also contains quantities of air-hardening oils that make an additional contribution to the ultimate resistance and stability of the new molding, as well as a considerable proportion of fatty acids, in particular oleic acid.

Natural resins also contain predominantly resin acids, resin alcohols, and their esters, as well as phenols that have the character of a tanning substance, as well as unsaturated compounds, some of which contain oxygen. In an advantageous manner, the tannin character appears in the matrix in combination with protein fractions, in particular, and thus contributes to the stability and resistance to water of the molding according to the present invention.

Bio-polymers such as starches of every kind and the plant parts that contain them, in particular of rice, potatoes, and corn, form the thermoplastic fraction. However, the starches and/or proteins that are present in the molding substance or in the material can be replaced by other bio-polymers such as lignin and/or hemi-celluloses, completely, or by dextrins, pectins, and/or chitins and the like in part, optionally up to 55%-wt, advantageously up to 20%-wt for specific applications.

Lignins, in particular, can make an additional contribution to increased resistance to water, and those of both plant or of animal origin, for example, the remains left after soya bean extraction, gelatins of every kind, and different collagens and the like are suitable as proteins.

The fibre material can be of any sort as long as it is of plant origin, e.g., cellulose, pulp, batting, paper and cardboard particles, mechanical wood pulp, etc., and preferably wood particles.

Because of its availability and its low prices, particularly if it is waste that has been generated, wood is particularly preferred as plant-fibre material; it imparts a light-beige color to the new material, usually without any additives, and this can be varied to a fairly dark brown, depending on the type of wood and the conditions under which it is processed. Maintaining the appropriate water content of the new molding ensures its wood-like characteristics as well as its resistance to moisture.

If white or a very light color is desired, it is advantageous to use pulp or cellulose, as well as cotton fibers or the like; these materials result in products with a high level of homogeneity and strength. Other fiber materials that can be used are, for example, straw, kapok, jute, etc.

In addition, the stability and strength of the molding according to the present invention can be controlled over a very wide range by varying the length and thickness of the fibre material that is used these can be, for example, 0.05–35 millimeters, preferably 1–5 millimeters in length and 0.05–3 millimeters, preferably 0.1–1.5 millimeters in thickness. Generally speaking, the longer the fibers, the greater the strength.

As far as the fats/oils/waxes are concerned, possible limits are set on these only with respect to their durability; hardening oils that function, on the one hand, as processing aids during the manufacture of the new molding and, on the other hand, ensure a long-term increasing cross-linking and consolidation of the components of the new product are advantageous. In addition, this group of substances have the advantage that they are already present in the molding substance as a mold-separation agent.

The following components or additives, at concentrations from 0.1–1.5-wt, in particular 0.5–3.0%-wt (relative in each instance to the total weight) are suitable for varying the properties of the new moldings with respect to color, feel, lustre, and strength: pigments, organic or inorganic fillers, tannins, softeners, biocides, and curable heat-hardening components, e.g., aldehyde resins. When tanning agents are used, if there is a protein melt-gel either in the matrix or present as a matrix, there will also be a tanning-like precipitation of the protein. This will result in a change in the properties, namely, increased resistance to quality-degrading influences, for example, losses of visual quality and, in particular, staining.

Additives such as resins and rubbers, preferably biogenic resins and rubbers, which increase resistance to both water and moisture, provide an advantageous increase in the spectrum of possible uses.

A useful secondary effect of polyvalent alcohols (polyols) for example of glycerine, which suppresses expansion, is their added effect as softeners.

As a consequence of production being carried out under high pressure, and because of the use of fibre material that is impregnated at least in part with resin acid(s)/fatty acid(s) and/or fats/oils/waxes, these components are pressed—at least in part—preferably onto the outside of the matrix. When this is done, it forms a surface layer that is up to 2 millimeters thick, with a higher concentration of resin acid (s)/fatty acid(s) and, if applicable, oils/fats/waxes that preferably increases towards the surface. This results in the added advantage of a moisture-resistant outer layer, which also guarantees an acceptable feel to the touch.

Because pores, voids, and the like have been eliminated, and because of the high secondary and final processing pressures that are used during manufacture, high density levels of, for example, $1.05–1.25$ $t/m^3$ and thus high mechanical stability values are achieved; these permit the production of highly-stressed joint elements, e.g., for furniture or utility articles. It is even possible to achieve a self-lubricating effect in such joints because of the content of fats, oils, and/or waxes in the outer layer.

In a particularly advantageous manner—which is especially so in view of the increasingly urgent demands for economy in the relevant branches of the economy and industry—the new material displays outstanding machining and processing characteristics and a high level of combinability that are analogous to those of wood. This makes the work done by the machine inventory used for machining and processing wood, as well as by the relevant production technology, much easier, so that there is no need to use alien production infrastructure to achieve thermoplasticity, and make up for a lack of adhesion in glued joints, melting, and the like.

The moldings according to the present invention are amenable both to non-cutting types of processing, such as lacquering, coating, or other similar plastic shaping, and to essentially quasi-thermoplastic and simultaneously cutting processes. In addition, they are free of the disadvantages or shortcomings displayed by thermoplastic materials with reference to adhesion or the plugging of tools such as abrasive papers, saws, files, etc.. At the same time, less dust is generated than is the case during cutting type machining when wood or the useful wood materials are being processed.

According to a preferred embodiment, the mouldings according to the present invention feel silky to the touch, even after shaping or other processes whereby material is removed, which means that the customer-friendly and good-feeling material will almost certainly be predestined for the economic production of highly stable, wear-resistant toys that pose no threat to health.

With respect to manufacturing the new-type mouldings, this is effected in a particularly preferred manner in two process stages: an extrusion stage and a dispersal stage for generating pre-mouldings, e.g., in granulate form, and a thermoplastic re-shaping stage, e.g., injection molding, to manufacture the desired mouldings, which are then distinguished, above all, by their homogeneous shape with statistically uniformly divided particles of the fibre material within the matrix, with a gel-smelt like state of the matrix occurring in a transition stage because of high pressure and high temperature in the course of this process.

The first stage in the process prevents any separation of the extremely different components, which could destroy the homogeneity of the end product, and simplifies the charging of the second process stage, e.g., an injection molding machine, to a significant degree. However, the second stage does not have to be charged immediately after the first stage of the process; rather, should it be necessary, this can be done after intermediate storage and/or conditioning (e.g., adjustment of the total moisture content, incorporation of an additive) and/or after transportation of the pre-mouldings.

If there are particular demands with respect to size, shape, and/or mechanical stability, it is advantageous that the thermoplastic shaping in the second process stage also be effected by extrusion or by molding. In this case, it is possible to manufacture mechanically strong moldings that can withstand great stresses, these moldings being in the form of composite bodies, in particular as multi-layer or laminated bodies, the material bond being based on thermoplastic welding of the flat material that is used.

In addition to the resin-acid component that, surprisingly, has a favorable effect on the wood-like properties of the new material and which can, in part, originate from the very wood particles that are used, it is extremely important for the density of the new product to prevent, completely, the expansion and pore formation that occur during manufacture, in which connection appropriate manufacturing conditions and expansion suppressants can be of specific help.

Thus, for example, it is expedient to reduce the exit velocity and thus the shear stresses by increasing the total cross section of the nozzle outlet for the extrusion in the first stage of the process, since this prevents expansion In the pre-molding or granulate stage.

Furthermore, when wood is used as the fibre material, because of the pressure and temperature some constituent substances of the wood may be either expressed or dissolved out of the wood, when they enter the gel or the gel matrix, where they enhance its quality, in particular its resistance to water, resistance to microorganisms, as well as its mechanical stability. Such constituent substances can be lignins, hemi-celluloses, tannins, fats or oils, pigments, and—in particular—resins.

A high degree of compactness and freedom from pores can be achieved in a particularly advantageous manner in that, on the one hand, the extrusion of pre-mouldings, for example, a granulate, is carried out in the first stage of the process at temperatures ranging from 70–135 degrees Celsius, in particular from 100–125 degrees Celsius, and at pressures ranging from 20–100 bar, in particular from 25–80 bar and, on the other hand, the injection molding is carried out in the second stage of the process at temperatures from 110–210 degrees Celsius, in particular from 150–180 degrees Celsius, and at pressures ranging from 250–1200 bar, in particular from 400–700 bar.

Furthermore, a method of proceeding with additives that suppress expansion, for example, glycerine, glycol, or polyoxyalkylene-glycol, can also be particularly effective since the polyols add an additional softening effect in a synergistic manner. These additives can be mixed into the basic substance at a concentration from 0.5–12%-wt, in particular 2–8%-wt, relative in each instance to the total mass.

An increased and broader utilization and use spectrum for the new type mouldings can be ensured without any problems by using additional additives to increase resistance to water, in particular those from the group of—preferably biogenic—resins and rubbers.

If it is desired to modify and/or consolidate the starch/protein matrix, one can, in an advantageous manner, add starch modifiers, in particular etherification and/or esterification components, and/or proteins modifiers, in particular in the form of pH adjustment and tanning agents.

A particularly effective measure for ensuring freedom from pores is to degas the fibre component itself, in particular if it is wood, for this means that using the two-stage process according to the present invention, this source of gas development is eliminated from the very outset, and it becomes possible to concentrate fully on suppressing expansion of the matrix or the molding substance. Such degassing can be carried out, for example, when the plant fibre material is being heated prior to being introduced into the first stage of the process, at temperatures of 170–220 degrees Celsius, in particular of 180–190 degrees Celsius.

If, in a similarly preferred manner, one soaks or impregnates the fibre material when it is still heated at least with a (molten) liquid component, in particular with the oil or fat component, preferably with hardened plant fat or hardening oils, and does this at least in part, and preferably when it is still heated introduces it into the first stage of the process, then, in addition to not inconsiderable energy savings, this will also result in greater impregnation of the fibre components which, in its turn, leads to a particularly uniform and delayed emergence of the substances from the wood particles into the matrix, and thus brings about a significant improvement in the properties of the material.

For various applications, it may be an advantage to treat the finished, extruded molding granulate of the first stage of the process subsequently with glycerine so that—after appropriate storage time, preferably after one day—the granulate becomes permeated with glycerine, which suppresses expansion; after being subjected to subsequent thermoplastic processing, this results in particularly compact largely pore-free mouldings.

In an especially preferred embodiment, in order to mix the base components according to the present invention, a natural, modified resin, e.g., diethyleneglycol abietinic acid ester, is added to them. In addition to its function as an emulsifier, its properties as a softener that is independent of moisture are an additional advantage. This effect renders the surface quality of the finished mouldings largely independent of specific external influences, such as variations in humidity.

Finally, the new mouldings that are obtained according to the present invention can be used to advantage for the most varied purposes, for example, as elements in motor vehicle, wood, and furniture construction, in particular for rails, decorative mouldings, edges, profiles, screens, knobs, handles, pegs, hooks, joints, strips, connecting and anchoring elements, furniture legs, housings, accessory parts, instrument panels, panelling, toys, fine household effects, packaging material, etc..

The present invention will be described in greater detail below on the basis of the following examples:

EXAMPLE 1

Process stage 1

Composition of the molding substance for manufacturing the pre-mouldings (e.g., granulate)

| %-wt | Components |
|---|---|
| 58.47 | wood chips (e.g., top-layer chips from chip board manufacture) |
| 23.39 | corn meal, finely ground (average particle size 0.4–0.8 millimeters) |
| 10.55 | resin acid (Sacocell 309, from Krems Chemie) |
| 2.92 | hardened plant fat, melting temperature: 45 degrees Celsius |
| 2.92 | glycerine |
| 1.75 | quick-drying linseed oil |

One hundred kg of long wood shavings, 0.2–5 millimeters long, are thoroughly mixed in a heatable mixer with 5 kg of hardened plant fat at 65 degrees Celsius, so that the wood absorbs the molten-liquid fat completely.

Subsequently, 40 kg of very finely ground corn meal with a fat content of 2.5%-wt. is mixed in.

This dry mixture is placed in an extruder, with the various liquids or liquid phases being metered in at different locations on the extruder housing.

The resin acid components (Sacocell 309 is a derivative of abietinic acid), emulsified in water and with a solids content of 50%-wt, is introduced shortly after the entry point; the glycerine is introduced at the middle, and the linseed oil is introduced before the last mixing zone.

Extrusion and separation are carried out in such a way that a granulate of approximately 2.5–3 millimeters results, and so that expansion is prevented by low gas temperature, low pressure, and a large, unobstructed nozzle area (larger number of nozzle apertures).

Extruder: CM 45 Cincinnati Milcron Screw type: SK 400 Nozzle: 20 round apertures, 2.5 millimeters.

Extrusion parameters: Screw speed: 70 rpm Throughput: 103 kg/hour Torque: 30% (SME approximately 0.05 kWh/kg) Mass pressure: 30 bar Mass temperature: 105 degrees Celsius Granulation in the nozzle-cut process to form spherical granulate.

The granulate obtained in this manner is conditioned to a total water content of 14%-wt by adjusting the air humidity, and in this state it is passed to an injection-molding machine for further processing.

Process stage 2:

Injection molding machine: Engel, ES 330/80 HL

The injection molding machine is so operated that the entry section is kept cool (approximately 30 degrees Celsius) and the mass temperature does not exceed 165 degrees Celsius during the injection molding process. The injection molding mold is intensely cooled so that it does not exceed a temperature of 20 degrees Celsius even in the case of short cycle times.

Expansion is prevented or suppressed by using greater injection entry cross-sections and smaller injection velocities in the first phase of the injection process.

A higher and pressure during the injection molding process causes the fat components to leave the wood fraction and, in conjunction with the cold mold, this results in problem-free separation from the mold. The work pieces obtained in this way (cylinders, 5 centimeters high and 4 millimeters diameter, which are about the color of ash have a smooth surface, the wood fraction being partially visible.

The properties of the mouldings so obtained are similar to those of wood and they can be finished by conventional wood-working methods such as drilling, sawing, sanding, slicing, cutting, gluing, dowelling, screwing, lacquering, coating, etc. Their resistance to corrosion is very similar to that of wood and for this reason it differs from such behavior as seen in the case of plastic.

Clear differences from wood can be seen in the high density (0.8–1.25 t/m$^3$) and in the isotropic structure. Resistance to water without surface treatment is only slightly lower than in the case of wood mouldings. Mechanical properties, in particular, strengths, are comparable to those of wood although, in contrast to wood, there is no shrinkage due to growth rings or knots.

The surface hardness of the new mouldings obtained by using the above-described composition corresponds to that of commercially available hard PVC. Their workability corresponds to that of wood, although without the disadvantages displayed by thermo-plastifiable plastics, i.e., glazing and plugging of tools (sand paper, saws, files, drills, etc.). At the same time, the amount of dust that is created during cutting operations is significantly less than is the case with wood or conventional wood-based materials.

EXAMPLE 2

Process stage 1

Composition of a molding substance for manufacturing a pre-molding granulate

| %-wt | Components |
|---|---|
| 50.95 | compacted, recycled, pourable pulp |
| 25.40 | very finely ground rice meal (average particle size 0.4 to 0.8 millimeters) |
| 12.70 | resin acid (Sacocell 309, Krems Chemie) |
| 6.85 | linseed oil 90P (Lechner & Crebert) |
| 4.11 | glycerine |

In contrast to Example 1, all of the linseed oil is mixed into the recycled pulp at room temperature, with the rice meal being mixed in at the same time. The resin acid component (Sacocell 309 is a derivative of abietinic acid) in aqueous solution and with a solid content of 50%-wt is introduced just after the entry point; the glycerine is introduced at the middle. There is no introduction of a component just before the last mixing zone. In all other respects, work is carried out analogously to Example 1, and this also applies to process step 2.

In contrast to those obtained as in Example 1, the granulate or pre-moldings obtained are not colored brown by the wood content. They can be colored as desired by the appropriate additives.

The mechanical properties are improved compared to those described in Example 1, and in certain areas they exceed those of wood to a considerable degree; for example, their compression resistance is considerably greater.

Only resistance to water is somewhat less without surface treatment, although this promotes biodegradablity under certain suitable ambient conditions, e.g., during composting.

EXAMPLE 3

Process stage 1

Composition of a molding substance for manufacturing a pre-molding granulate

| %-Wt | Components |
|---|---|
| 56.60 | pourable pulp fibers |
| 12.58 | potato starch |
| 12.58 | bone lime |
| 9.44 | resin acid (Sacocell 309) |
| 3.77 | ethylene glycol |
| 3.77 | linseed oil 90P (Lechner & Crebert) |
| 1.26 | glutaraldehyde |

As has been described in Example 1, the cellulose fibers are coated with linseed oil; then the bone line and potato starch are mixed in and the dry mixture is placed into the extruder. Resin acid, glycol, and glutaraldehyde are introduced into the extruder housing at different points, the glutar aldehyde being added just before the last mixing zone, shortly before the extruder outlet.

Process stage 2

The pre-molding granulate obtained from process stage one was processed in the injection-molding machine under the conditions described for Example 1.

Because of the linseed oil stored in the cellulose fibers, which is partially expressed as a result of the high injection pressure, as has been described in the preceding examples, separation from the mold could be effected without any difficulty. The glutaraldehyde that is used denatures the bone lime so that the work pieces were hardened and became resistant to water. This entails the advantage that the mouldings so obtained are made completely water resistant without any surface treatment. However, biological breakdown during composting then takes place somewhat slower.

EXAMPLE 4 (Comparative Example)

The same procedure as in Example 2 was followed, using the following recipe:

| %-Wt | Components |
| --- | --- |
| 48.31 | wood shavings |
| 32.24 | corn meal |
| 10.49 | resin acid (Sacocell 309) |
| 4.76 | glycerine |
| 4.20 | linseed oil |

The amount of linseed oil is unacceptably high when wood shavings are used as the fibre material, so that the separation of oil could be observed on the surface of the work pieces so obtained. It is obvious that, using this receipe, the upper limit for linseed oil had been exceeded.

EXAMPLE 5 (Comparative Example)

The same procedure as in Example 2 was followed, using the following recipe:

| %-Wt | Component |
| --- | --- |
| 56.47 | wood shavings |
| 24.22 | ground corn |
| 12.28 | resin acid (Sacotan 85, Krems Chemie) |
| 4.76 | glycerine |
| 2.27 | linseed oil |

Sacotan 85 is a resin acid derivative with a low melting point. The glycerine used in this example is a crude glycerine from raps-methylester (rme) plants. Using this composition, once again, a higher proportion of wood fibre was tried with a simultaneously reduced quantity of starch. It was shown that both the manufacture of pre-molding granulate as well as the injection molding of the mouldings proceeded without any problems. An upper limit for the amount of wood in the end mixture was not nearly reached in this instance.

EXAMPLE 6

The same procedure as in Example 2 was followed, using the following recipe:

49.03 straw
32.74 ground corn
11.52 resin acid (sacotan 85)
4.76 glycerine
1.95 linseed oil The pre-moldings or pre-molding-granulate can be manufactured without any problem. However, the mechanical stability and strength of the mouldings that are obtained using this mixture are somewhat reduced.

EXAMPLE 7

The same procedure as in Example 2 was followed, using the following recipe:

| %-Wt | Components |
| --- | --- |
| 49.42 | wood shavings |
| 32.95 | ground corn |
| 9.61 | resin acid (Sacocell 309) |
| 4.76 | glycerine |
| 1.63 | linseed oil |
| 1.63 | naturally modified resin ("Weich-Harz," Krems Chemie) |

In contrast to Example 2, the extrusion parameters used in the first stage of the process were modified in that the mass temperature was approximately 115 degrees Celsius. This brings about an improved disintegration of the starch components and, as a consequence of this, improved flow of the molding mass during injection molding during the second stage of the process. The expansion behavior was somewhat more difficult to manage when this was done.

In addition to the components known from Example 2, resin acids from natural, modified resin were included in the recipe. Polyol-abietinic acid ester, such as the "Weich-Harz," manufactured by Krems Chemie, which was used and which essentially contains diethylenelycol abietinic acid ester, was intended as an additional—and, compared to glycerine, essentially less moisture-dependent—softener and as an emulsifier for larger quantities of linseed oil.

The differences in the mouldings compared to the mouldings as in Example 2 were slight. The effects of natural, modified resin as an emulsifier are only fully effective in the case of greater additions of linseed oil.

EXAMPLE 8

The same procedure as in Example 2 was followed, using the following recipe:

| %-Wt | Components |
| --- | --- |
| 50.28 | wood shavings |
| 33.55 | ground corn |
| 9.74 | resin acid (Sumatra Dammar, Worlee) |
| 4.67 | glycerine |
| 1.67 | linseed oil |

This mixture was selected in order to test the effects of a non-derivatised natural hard resin. The solid hard resin was added to the dry mixture in ground form.

In addition to minor problems at the extruder entry point, separation of the finished injection molded mouldings from the mold was not as satisfactory as had been expected. Because of this experience, the use of prepared natural resins or their resin acids seems to be more useful on account of the their better-defined characteristics.

EXAMPLE 9 (Comparative Example)

The same procedure as in Example 2 was followed, using the following recipe:

| %-Wt  | Components   |
|-------|--------------|
| 57.14 | wood shavings |
| 38.10 | ground corn  |
| 4.76  | glycerine    |

Under conditions considered normal for the present invention, no mouldings could be produced from this mixture. The unsatisfactory flow behavior of the molding mass did not permit proper filling of the injection molding mold. Separation from the mold of the incompletely formed mouldings was not acceptable. The addition of resin acids and/or fatty acids (both components are contained, for example, in tall oil) was thus shown to be an essential component of the recipe.

EXAMPLE 10 (Comparative Example)

The same procedure as in Example 2 was followed, using the following recipe:

| %-Wt  | Components             |
|-------|------------------------|
| 50.96 | wood shavings          |
| 33.98 | ground corn            |
| 10.36 | resin acid (Sacocell 309) |
| 4.76  | glycerine              |

The granulates for the pre-molding can be produced without any problem. In contrast to this, separation from the mold at the injection molding machine varies from poor to unacceptable. There was also undesirable expansion. The lack of the oil component, in particular, clearly has a negative effect.

EXAMPLE 11 (Comparative Example)

The same procedure as in Example 2 was followed, using the following recipe:

| %-Wt  | Components             |
|-------|------------------------|
| 47.50 | wood chips             |
| 31.70 | ground corn            |
| 11.43 | resin acid (Sacocell 309) |
| 4.76  | glycerine              |
| 4.61  | sodium chloride        |

It is true that, in this example, the addition of sodium chloride reduced the expansion processes, but it did not eliminate them completely. Above and beyond this, separation from the mold was poor because of the lack of linseed oil. Giver a mixture of this kind, the concentration of the additives that suppress expansion, must be increased, and/or still others must be included, in order to bring about effective suppression of expansion.

EXAMPLE 12

An especially preferred embodiment of the present invention contains the following:

| %-Wt  | Components                                                         |
|-------|--------------------------------------------------------------------|
| 50.5  | wood shavings (0.05–35 millimeters long, 0.05–3 millimeters thick) |
| 28.0  | fine ground corn                                                   |
| 10.8  | resin acid (Sacocell 309)                                          |
| 6.9   | glycerine                                                          |
| 1.9   | linseed oil                                                        |
| 1.9   | naturally modified resin ("Weich-Harz," Krems Chemie)              |

The same procedure as in Example 2 was followed, with the following differences:

All of the linseed wall and the "Weich-Harz" (diethyleneglycol abietinic acid ester) were mixed into the wood shavings at room temperature, the corn meal being mixed in at the same time. Shortly before the point at which the mass enters the extruder, the resin acid component (Sacocell 309) was pumped into the extruder in the form of an aqueous emulsion.

The pre-mouldings-granulates obtained after the extrusion process are dried to a total water content of 5%-wt and then acted upon by the appropriate quantity of glycerine, this glycerine being completely resorbed by the granulate within a few hours.

In the second stage of the process, the mass can be processed at a temperature of 110–200 degrees Celsius, preferably, however, between 150–170 degrees Celsius. In contrast to the preceding examples, the injection mold was not cooled; rather, it was conditioned to a maximum of 90 degrees Celsius, preferably 80 degrees Celsius, when, because of the selected recipe and method of processing, problem-free separation from the mold nevertheless took place.

The injection speed can be selected within a relatively wide range without any loss of quality, and compared to different injection speeds, the process proved to be stable and robust. However, it is recommended that a higher dwell pressure be set within the context of the closing force relationship in order to eliminate any partial expansion that may possibly occur during injection.

Tempering to at most 90 degrees Celsius clearly has positive effects on the quality of the surface and the mechanical strength of the mouldings in comparison to those produced by according to the preceding examples.

We claim:

1. A thermoplastic molding based on a molding mass which comprises particles of at least one plant fiber material and further additives, and wherein the particles are embedded and essentially statistically uniformly distributed in a matrix of at least one gel-melt forming biopolymer, which matrix has been converted to a gel-melt state at a temperature above ambient temperature and at a pressure above atmospheric pressure, and wherein said molding a) is present in a substantially unexpanded form, and is essentially free of pores;

b) has a total water content of 3–18%-wt; and wherein said c) particles of the plant fiber material are 0.05–35 millimeters long and are impregnated, at least in part, with at least one resin acid.

2. A molding as defined in claim 1, wherein the plant fiber material contains at least one component selected from the group consisting of wood, cellulose, and cellulose obtained from recycled fiber material, and wherein the gel-melt forming biopolymer is selected from the group consisting of starch, protein, lignin, hemi-cellulose, dextrin, pectin, and chitin.

3. A molding as defined in claim 1, wherein the at least one resin acid originates from at least one component selected from the group consisting of tall oil and natural resins.

4. A molding as defined in claim 1, wherein the fiber material is 0.05–3 millimeters thick.

5. A molding as defined in claim 1, wherein the fiber material comprises wood particles that are 0.15–35 millimeters long, and 0.5–3 millimeters thick.

6. A molding as defined in claim 1, further comprising at least one additive selected from the group consisting of fats, oils and waxes.

7. A molding as defined in claim 1, further comprising at least one expansion suppressing agent selected from the group consisting of a polyol and an inorganic salt.

8. A molding as defined in claim 1, further comprising relative to the total weight 0.1–5%-wt of at least one substance selected from the group consisting of pigments, organic fillers, inorganic fillers, tanning agents, softeners, biocides, and hardenable hot-hardening components.

9. A molding as defined in claim 1, further comprising at least one water resistance increasing component selected from the group consisting of natural resins and natural rubbers.

10. A molding as defined in claim 1, further comprising at least one component selected from the group consisting of starch modifying agents and protein modifying agents, and wherein the protein modifying agents are selected from the group consisting of pH-adjusting agents and tanning agents.

11. A molding as defined in claim 1, which has a surface layer that is up to approximately 2 millimeters thick, in which the concentration of the at least one resin acid is higher than in an interior of the molding.

12. A molding as defined in claim 1, which has a greater density than the at least one plant fiber material that is integrated into it.

13. A molding which comprises particles of at least one plant fiber material, a matrix of at least one gel-melt forming biopolymer, and further additives, wherein said molding is essentially free of pores and is formed from at least two moldings as defined in claim 1.

14. A molding as defined in claim 1, wherein the molding is of an essentially homogeneous form wherein the particles are statistically uniformly distributed in the matrix.

15. A molding according to claim 13 in the form of a composite body wherein the at least two moldings are connected to each other via flat joints by thermoplastic welding.

16. A process for manufacturing the thermoplastic molding of claim 1, the process comprising:
 a) preparing a molding mass which contains as a matrix at least one gel-melt forming biopolymer, and which molding mass further contains plant fiber material comprising particles of 0.05–35 mm in length, at least one resin acid, further additives, and 3–18%-wt water,
 b) mixing and compressing, to form a mixture, the molding mass of step a) at a temperature above ambient temperature and at a pressure above atmospheric pressure until it is converted into a gel-melt state and the plant fiber material is at least partially impregnated with said at least one resin acid, and
 c) subjecting the mixture of step b) to a shaping process at expansion suppressing conditions to yield essentially pore-free moldings with thermoplastic properties.

17. A process as defined in claim 16, wherein the molding is produced in the form of granules.

18. A process as defined in claim 16, comprising at least one process step selected from the group consisting of single-stage extrusion and injection-molding.

19. A process as defined in claim 16, wherein the molding mass comprises the following components, given in percent of total weight:
 40–80%-wt of the plant fiber material;
 15–45%-wt of at least one biopolymer selected from the group consisting of starches, proteins, lignins, hemicelluloses, dextrins, pectins, and chitins;
 2–15%-wt of at least one resin acid or of a mixture of at least one resin acid and at least one fatty acid;
 1–10%-wt of at least one ingredient selected from the group consisting of fats, oils and waxes; and
 0.5–12%-wt of at least one expansion suppressing component selected from the group consisting of polyols and salts.

20. A process as defined in claim 19, wherein in step b) the fiber material in addition is at least partially impregnated with a component selected from the group consisting of fatty acids, fats, oil and waxes.

21. A process as defined in claim 16, further comprising subjecting the moldings obtained from step c) of the process to at least one additional shaping step selected from the group consisting of a thermoplastic processing under expansion suppressing conditions, a processing that can be carried out by means of conventional cutting woodworking tools or cutting woodworking processes, and a processing that can be carried out by means of conventional non-cutting woodworking tools or non-cutting woodworking processes.

22. A process as defined in claim 21, wherein said thermoplastic processing comprises at least one method selected from the group consisting of single-stage extrusion and injection molding.

23. A process as defined in claim 21, wherein at least two of the moldings are bonded to each other by thermoplastic welding at a pressure above atmospheric pressure and at a temperature above ambient temperature.

24. A process as defined in claim 16, wherein the extrusion of the moldings is carried out at temperatures in the range of 70–135 degrees Celsius and at pressures from 20–100 bar.

25. A process as defined in claim 21, wherein said additional thermoplastic processing is done by injection molding at temperatures from 110–210 degrees Celsius and at pressures from 250–1200 bar.

26. A process as defined in claim 16, wherein at least one component selected from the group consisting of glycerine, glycol, polyoxyalkylene glycol, and sodium chloride is added to suppress expansion.

27. A process as defined in claim 16, further comprising adding to the molding mass in step a) 0.1–5%-wt, relative to the total weight, of at least one component selected from the group consisting of a pigment, an organic filler, an inorganic filler, a tanning agent, a softener, a biocide, and a hot hardening component.

28. A process as defined in claim 16, wherein at least one agent for increasing water resistance is added to the matrix.

29. A process as defined in claim 16, further comprising adding to the molding mass in step a) at least one component selected from the group consisting of a starch modifying agent and a protein modifying agent, and wherein the protein modifying agent is selected from the group consisting of pH-adjusting agents and tanning agents.

30. A process as defined in claim 16, wherein the plant fiber material is heated to temperatures from 170–220 degrees Celsius prior to being subjected to step a) of the process.

31. A process as defined in claim 30, wherein the plant fiber material—while still in a heated state—is impregnated, at least in part, with at least one (molten) liquid component selected from the group consisting of resin acids, fatty acids, oils, fats and waxes.

32. A process as defined in claim 30, wherein the plant fiber material, optionally being impregnated, at least in part, with at least one (molten) liquid component selected from the group consisting of resin acids, fatty acids, oils, fats and waxes, is fed to an extruder while still in the heated state.

33. A process as defined in claim 23, wherein the moldings from step c) of the process are treated externally with a polyol before being subjected to said additional shaping step.

34. A molding as defined in claim 1, for use as an element in the construction of vehicles, of wooden articles and of furniture, in particular for rails, decorative strips, edges, profiles, screens, knobs, handles, pegs, hooks, joints, bands, connecting and anchoring elements, furniture legs, housings, accessory parts, instrument panels, coverings, toys, household goods, and packaging materials.

35. A molding as defined in claim 1, wherein the total water content is 4–12%-wt.

36. A molding as defined in claim 1, wherein the particles are further impregnated, at least in part, with a fatty acid.

37. A molding as defined in claim 4, wherein the fiber material is 0.1–1.5 mm thick.

38. A molding as defined in claim 5, wherein the wood particles are 1–5 mm long and 0.1–1.5 mm thick.

39. A molding as defined in claim 6, wherein the particles of the plant fiber material are at least partially impregnated with said at least one additive.

40. A molding as defined in claim 7, wherein the polyol is selected from the group consisting of glycerine, glycol, and polyoxyalkylene glycol, and the salt is sodium chloride.

41. A molding as defined in claim 8, wherein said at least one substance is present at a concentration of 0.5–3%-wt relative to the total weight and wherein said hot-hardening component is an aldehyde resin.

42. A molding as defined in claim 10, wherein the starch modifiers are selected from the group consisting of etherifying agents and esterifying agents.

43. A molding as defined in claim 11, wherein the at least one resin acid is present in admixture with at least one component selected from the group consisting of fatty acids, fats, oils, and waxes, and wherein the concentration of the resin acid and of said at least one component is higher in the surface layer than in the interior of the molding and is increasing towards a surface of the molding.

44. A molding as defined in claim 12, wherein the density is 0.8–1.25 t/m³ and the plant fiber material is wood.

45. A molding as defined in claim 15, in the form of a laminated body.

46. The process according to claim 23, wherein said additional shaping step takes place after intermediate storage, conditioning or transportation.

47. A process according to claim 19, wherein the molding mass comprises the following components, given in percent of total weight:

48–60%-wt of the plant fiber material selected from the group consisting of wood, cellulose and cellulose obtained from recycled fiber material;

20–35%-wt of said at least one biopolymer;

5–10%-wt of said at least one resin acid or of said mixture;

1.5–7%-wt of said at least one ingredient selected from the group consisting of a fat, an oil, and a wax, the oil being a drying oil;

2–8%-wt of said at least one expansion suppressing component, wherein said polyol comprises at least one component selected from the group consisting of glycerine, glycol, and polyoxyalkylene glycol, and the salt comprises sodium chloride; and 4–12%-wt water.

48. A process according to claim 47, wherein the starch originates from starch-containing cereals.

49. A process according to claim 19, wherein the fatty acid is obtained from tall oil or natural resins, and wherein the resin acid or the mixture is applied as an aqueous emulsion.

50. A process according to claim 22, wherein a multi-layer or laminated body is formed.

51. A process according to claim 24, wherein the temperature is in the range of 100–125 degrees Celsius and the pressure is in the range of 25–80 bar.

52. A process according to claim 25, wherein the temperature is in the range of 150–180 degrees Celsius and the pressure is in the range of 400–700 bar.

53. A process according to claim 29, wherein the starch modifying agent is selected from the group consisting of etherifying agents and esterifying agents.

54. A process according to claim 30, wherein the plant fiber material is heated to temperatures from 180–190 degrees Celsius, for purposes of degassing.

55. A processing according to claim 31, wherein the oils comprise drying oils and the fats comprise hardened plant fat.

56. A process according to claim 33, wherein the polyol is glycerine.

57. A molding as defined in claim 1, comprising the following components in the following amounts:

40–80%-wt of the at least one plant fiber material;

15–45%-wt of the at least one gel-melt forming biopolymer, said gel-melt forming biopolymer being selected from the group consisting of starches, proteins, lignins, hemi-celluloses, dextrins, pectins, and chitins;

2–15%-wt of the at least one resin acid or of a mixture of the at least one resin acid and at least one fatty acid;

1–10%-wt of at least one ingredient selected from the group consisting of fats, oils and waxes; and 0.5–12%-wt of at least one expansion suppressing component selected from the group consisting of polyols and salts.

58. A process as defined in claim 23, wherein at least one component selected from the group consisting of glycerine, glycol, polyoxyalkylene glycol, and sodium chloride is added to suppress expansion.

59. A molding as manufactured according to claim 16, for use as an element in the construction of vehicles, of wooden articles and of furniture, in particular for rails, decorative strips, edges, profiles, screens, knobs, handles, pegs, hooks, joints, bands, connecting and anchoring elements, furniture legs, housings, accessory parts, instrument panels, coverings, toys, household goods, and packaging materials.

60. A molding as manufactured according to claim 23, for use as an element in the construction of vehicles, of wooden articles and of furniture, in particular for rails, decorative strips, edges, profiles, screens, knobs, handles, pegs, hooks, joints, bands, connecting and anchoring elements, furniture legs, housings, accessory parts, instrument panels, coverings, toys, household goods, and packaging materials.

* * * * *